(12) United States Patent
Gupta et al.

(10) Patent No.: US 9,338,657 B2
(45) Date of Patent: May 10, 2016

(54) SYSTEM AND METHOD FOR CORRELATING SECURITY EVENTS WITH SUBSCRIBER INFORMATION IN A MOBILE NETWORK ENVIRONMENT

(71) Applicant: McAfee, Inc., Santa Clara, CA (US)

(72) Inventors: Bikram Kumar Gupta, Sunnyvale, CA (US); Elanthiraiyan Ammoor Anbalagan, Sunnyvale, CA (US); Sakthikumar Subramanian, San Jose, CA (US); Manish Gupta, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 287 days.

(21) Appl. No.: 13/652,923

(22) Filed: Oct. 16, 2012

(65) Prior Publication Data
US 2014/0105119 A1    Apr. 17, 2014

(51) Int. Cl.
*H04W 72/04*    (2009.01)
*H04W 12/12*    (2009.01)
*H04L 12/26*    (2006.01)
(Continued)

(52) U.S. Cl.
CPC ........... *H04W 12/12* (2013.01); *H04L 61/1588* (2013.01); *H04L 43/028* (2013.01); *H04L 61/103* (2013.01); *H04L 61/605* (2013.01); *H04L 61/6054* (2013.01); *H04L 63/1416* (2013.01); *H04L 63/1433* (2013.01)

(58) Field of Classification Search
USPC ......................................... 370/329, 328, 349
See application file for complete search history.

(56) References Cited

U.S. PATENT DOCUMENTS 5,987,610 A    11/1999    Franczek et al.
6,073,142 A    6/2000    Geiger et al.
(Continued)

FOREIGN PATENT DOCUMENTS

| WO | WO 00/44148 | 7/2000 |
|---|---|---|
| WO | WO 2014/062629 A1 | 4/2014 |
| WO | WO 2014/105309 A1 | 7/2014 |

OTHER PUBLICATIONS

USPTO Jun. 24, 2014 Nonfinal Rejection in U.S. Appl. No. 13/731,480, 16 pages.
(Continued)

*Primary Examiner* — Dang Ton
*Assistant Examiner* — Pamit Kaur
(74) *Attorney, Agent, or Firm* — Patent Capital Group (57) ABSTRACT

A method is provided in one example embodiment and includes receiving a subscriber accounting start packet for a subscriber device in a mobile network environment. The method also includes extracting, from the subscriber accounting start packet, subscriber device information and a network address of the subscriber device. The method further includes mapping the network address to the subscriber device information, and then correlating the subscriber device information and a security event when the security event is detected in subscriber data network traffic associated with the subscriber device. In a specific embodiment, the subscriber device information includes at least one of an International Mobile Equipment Identity (IMEI), an International Mobile Subscriber Identity (IMSI), a Mobile Station International Subscriber Directory Number (MSISDN), and an access point name (APN). In further embodiments, an identification of the security event and one or more items of the subscriber device information are provided to a user.

20 Claims, 6 Drawing Sheets

(51) Int. Cl.
*H04L 29/06* (2006.01)
*H04L 29/12* (2006.01)

(56) References Cited

U.S. PATENT DOCUMENTS

| | | | |
|---|---|---|---|
| 6,460,050 | B1 | 10/2002 | Pace et al. |
| 7,506,155 | B1 | 3/2009 | Stewart et al. |
| 7,631,355 | B2 | 12/2009 | Bolt et al. |
| 7,676,217 | B2 | 3/2010 | Zhu et al. |
| 7,841,008 | B1 | 11/2010 | Cole et al. |
| 7,855,982 | B2 | 12/2010 | Ramankutty et al. |
| 7,954,141 | B2 | 5/2011 | De Lutiis et al. |
| 8,261,093 | B1 | 9/2012 | Dhesi et al. |
| 8,321,504 | B2 | 11/2012 | Goyet et al. |
| 8,321,541 | B1 | 11/2012 | Bennett et al. |
| 9,185,093 | B2 | 11/2015 | Gupta et al. |
| 2002/0150110 | A1 | 10/2002 | Inbar et al. |
| 2002/0155825 | A1 | 10/2002 | Haumont et al. |
| 2004/0141507 | A1 | 7/2004 | Michel |
| 2005/0111453 | A1 | 5/2005 | Mizutani |
| 2006/0156380 | A1 | 7/2006 | Gladstone et al. |
| 2006/0262742 | A1 | 11/2006 | Dommaraju et al. |
| 2006/0282896 | A1 | 12/2006 | Qi |
| 2007/0113269 | A1 | 5/2007 | Zhang |
| 2008/0130623 | A1* | 6/2008 | Skog et al. ............. 370/349 |
| 2010/0040233 | A1 | 2/2010 | Ganapathy |
| 2010/0162240 | A1 | 6/2010 | Zhang et al. |
| 2010/0268524 | A1 | 10/2010 | Nath et al. |
| 2011/0179484 | A1 | 7/2011 | Tuvell et al. |
| 2011/0211682 | A1 | 9/2011 | Singh et al. |
| 2011/0255688 | A1 | 10/2011 | Spalink et al. |
| 2011/0265109 | A1* | 10/2011 | Goyet et al. ............. 725/9 |
| 2011/0265173 | A1 | 10/2011 | Naaman et al. |
| 2012/0005026 | A1 | 1/2012 | Khan et al. |
| 2012/0023562 | A1* | 1/2012 | Harp et al. ............. 726/7 |
| 2012/0115442 | A1 | 5/2012 | Dadu et al. |
| 2012/0122423 | A1 | 5/2012 | Helmreich |
| 2012/0226554 | A1 | 9/2012 | Schmidt et al. |
| 2012/0233656 | A1 | 9/2012 | Rieschick et al. |
| 2012/0233694 | A1* | 9/2012 | Baliga et al. ............. 726/23 |
| 2014/0189861 | A1 | 7/2014 | Gupta et al. |

OTHER PUBLICATIONS

Computer desktop encyclopedia, "processor", date accessed Jun. 16, 2014 http://lookup.computerlanguage.com/host_app/search?cid=C999999&term=processor&lookup=Go, 2 pages.
International Search Report and Written Opinion in International Application No. PCT/US2013/064968, mailed Jan. 24, 2014, 11 pages.
International Search Report and Written Opinion in International Application No. PCT/US2013/071335, mailed Feb. 27, 2014, 8 pages.
USPTO Jan. 15, 2015 Final Rejection in U.S. Appl. No. 13/731,480, 23 pages.
USPTO Jun. 25, 2015 Notice of Allowance in U.S. Appl. No. 13/731,480, 26 pages.
International Preliminary Report on Patentability in International Application No. PCT/US2013/064968, mailed on Apr. 21, 2015, 6 pages.
International Preliminary Report on Patentability in International Application No. PCT/US2013/071335, mailed Jul. 9, 2015, 7 pages.
U.S. Appl. No. 14/935,826, filed Nov. 9, 2015, entitled "System and Method for Correlating Security Events With Subscriber Information in a Mobile Network Environment," Inventors Bikram Kumar Gupta, et al., 39 pages.

* cited by examiner

SYSTEM AND METHOD FOR CORRELATING SECURITY EVENTS WITH SUBSCRIBER INFORMATION IN A MOBILE NETWORK ENVIRONMENT

TECHNICAL FIELD

This disclosure relates in general to the field of mobile network security, and more particularly, to correlating security events with subscriber information in a mobile network environment.

BACKGROUND

Advances in hardware and communication technologies have resulted in the proliferation of mobile devices and mobile network environments all over the world. Today's mobile devices are powerful computing systems that operate on various platforms and have the ability to provide users with network access connectivity and access to needed resources, even when in transit. As mobile devices have soared in popularity, malicious software ("malware") targeting mobile devices has also increased. Until recently, network security solutions have been largely focused on traditional computer networks and the protection of network elements and network endpoints in those networks. With the rise of mobile malware in wireless networks and the extraordinary expansion of mobile devices, however, it has become critical to the security of mobile devices and mobile networks, to apply tailored mobile security solutions in wireless operator networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a subscriber accounting start packet for a subscriber device in a mobile network environment. The method also includes extracting, from the subscriber accounting start packet, subscriber device information and a network address of the subscriber device. The method further includes mapping the network address to the subscriber device information and also correlating the subscriber device information and a security event when the security event is detected in subscriber data network traffic associated with the subscriber device.

In specific embodiments, the subscriber device information includes at least one of an International Mobile Equipment Identity (IMEI), an International Mobile Subscriber Identity (IMSI), a Mobile Station International Subscriber Directory Number (MSISDN), and an access point name (APN). In more specific embodiments the mapping includes storing the network address and the subscriber device information in a mapping table. In even more specific embodiments, the method includes receiving a subscriber accounting stop packet, identifying a network address in the accounting stop packet, searching the mapping table for a stored network address corresponding to the network address of the accounting stop packet, and deleting the stored network address from the mapping table.

Example Embodiments

Figure 1:
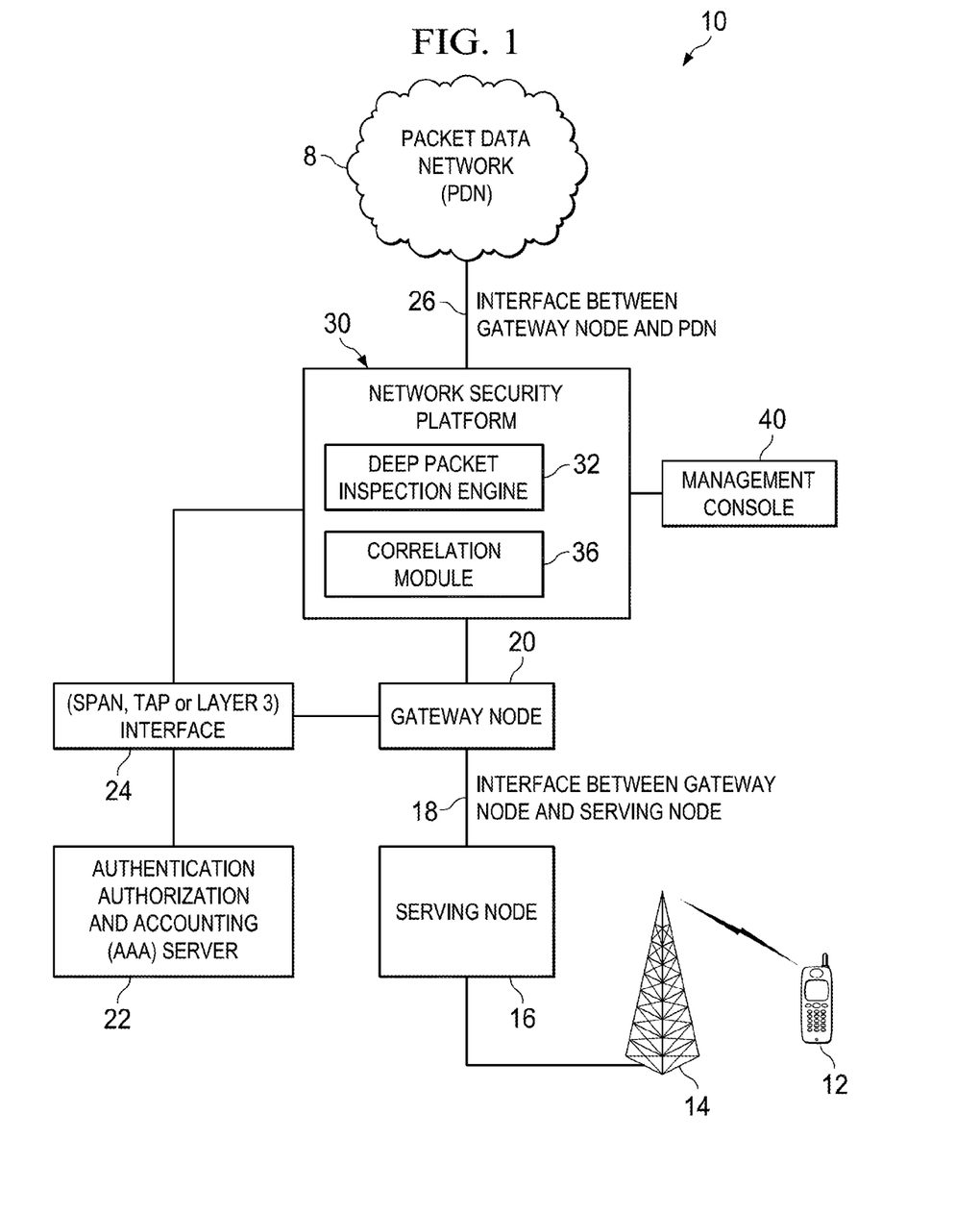
FIG. 1 is a simplified block diagram of a communication system for correlating security events with subscriber information in a mobile network environment in accordance with an embodiment of the present disclosure.

Turning to FIG. 1, FIG. 1 is a simplified block diagram of a communication system 10 for correlating security events with subscriber information in a mobile network environment. FIG. 1 includes an example subscriber device 12 connected to a radio tower 14, which enables communications between subscriber device 12 and other subscriber devices and networks, such as a packet data network (PDN) 8. A mobile service provider's core network in communication system 10 can include a serving node 16, a gateway node 20, and a connection interface 18 between serving node 16 and gateway node 20. In addition, the core network may include an Authentication, Authorization, and Accounting (AAA) server 22, a network security platform 30, and an interface 24 between AAA server 22 and network security platform 30, for receiving accounting packets with subscriber device information. The core network may also include a connection interface 26 that couples gateway node 20 to packet data network 8. Network security platform 30 can be configured with a deep packet inspection engine 32 and a correlation module 36. Network security platform 30 may also be configured to communicate with a management console 40. PDN 8 can include public networks (e.g., the Internet) and/or private networks (e.g., a private corporate network) that communicate by sending and receiving data in packets.

Elements of FIG. 1 may be coupled to one another through one or more interfaces employing any suitable connection (wired or wireless), which provide viable pathways for electronic communications. Additionally, any one or more of these elements of FIG. 1 may be combined or removed from the architecture based on particular configuration needs.

Generally, communication system 10 may be implemented in any suitable type or topology of network (e.g., Intranet, Extranet, LAN, WAN, WLAN, MAN, VLAN, VPN, cellular network, etc.) or suitable combinations thereof, including wired and/or wireless communication. In communication system 10, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 10. Suitable interfaces and infrastructure may be provided to enable communication between the cellular network and the packet data networks.

A packet is a unit of data that can be routed between an origin and a destination on a packet-switched network, such as packet data network 8 or a packet-switched domain of a mobile service provider's core network. A packet includes a source network address and a destination network address. These network address can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

For purposes of illustrating certain example techniques of communication system 10, it is important to understand the communications that may be traversing the mobile network environment. The following foundational information may be viewed as a basis from which the present disclosure may be properly explained.

A mobile phone is a mobile electronic device that can make and receive telephone calls over a radio link, by connecting to a cellular network provided by a mobile service provider. A smartphone is a mobile phone built on a mobile operating system, with advanced computing capability and network access capability. Mobile service providers also offer packet-switched networks for handling mobile data sent and received by smartphones.

Traditionally, mobile phones were not as susceptible to malicious software, at least in part because they were not configured to allow network connectivity to packet data networks like the Internet. The explosion of smartphones into the market, however, has prompted a significant increase in threats in wireless networks used by mobile phones including, for example, 3G, 4G, LTE, etc. networks. In particular, some malicious software ("malware") is designed specifically to target smartphones.

Mobile service providers provide wireless communications services, including radio communications and packet-switched network communications to subscriber devices. A 'subscriber device,' as used herein, is intended to refer to a smartphone or any other wireless device configured to send data to and receive data from a packet data network via a cellular network (e.g., 3G, 4G-LTE, etc.). Mobile service providers typically offer core networks with a packet-switched domain configured to receive radio signal communications from a subscriber device, convert the radio signals to data packets, and send the data packets to a destination node via a packet data network. The packet-switched domain of a core network can also be configured to receive data packets from a node on a packet data network, convert the data packets to radio signals, and send the radio signals to a subscriber device.

With reference to FIG. 1, a packet-switched domain of a mobile service provider's core network generally includes serving node 16, gateway node 20, connection interface 18 between serving node 16 and gateway node 20, and connection interface 26 between gateway node 20 and packet data network 8. The serving node is capable of communicating via radio signals on one end and capable of communicating via packet data (e.g., Internet Protocol) at another end over connection interface 18 to the gateway node. The gateway node is capable of communicating via packet data over connection interface 26 to a packet data network, such as the Internet.

One example core network may include Universal Mobile Telecommunications Service (UMTS), which is a packet-based wireless communication service enabling continuous connection to the Internet for 3G wireless connection. In this service, with reference to FIG. 1, serving node 16 is referred to as a Serving GPRS Support Node (SGSN), and gateway node 20 is referred to as a Gateway GPRS Support Node (GGSN). A 'Gn interface' is connection interface 18 between the SGSN and the GGSN. A 'Gi interface' is connection interface 26 between the GGSN and a destination network such as the Internet or other public or private packet data network.

Another example core network may be configured for 4G Long Term Evolution (LTE) wireless communication standard. In this core network, with reference again to FIG. 1, serving node 16 is referred to as a Serving Gateway (S-GW), and gateway node 20 is referred to as a PDN Gateway (P-GW). An 'S5 interface' is connection interface 18 between the S-GW and the P-GW. An 'SGi interface' is connection interface 26 between the P-GW and a destination network such as the Internet or other public or private packet data network.

In yet another example, a core network may be configured for CDMA2000 standards. In this scenario, gateway node 20 of FIG. 1 is referred to as a packet data serving node (PDSN). PDSN may perform the functions of both serving node 16 and gateway node 20.

Mobile phones can have several unique identifiers. An International Mobile Equipment Identity (IMEI) uniquely identifies a mobile phone internationally and is generally allocated by the equipment manufacturer. An International Mobile Subscriber Identity (IMSI) is a unique number allocated to each mobile subscriber in a mobile communication network (e.g., Global System for Mobile Communications (GSM)) that identifies the subscriber and his or her subscription with the network. An IMSI can be stored in a subscriber identity module (SIM) of mobile phones. Some phones, however, are not configured to use SIMs. A unique Mobile Station International Subscriber Directory Number (MSISDN) is a mobile telephone number used to identify a mobile phone internationally and is used to make and receive calls on the mobile phone.

An access point name (APN) is a network identifier used by a mobile phone when connecting to a core network of an mobile service provider. The mobile service provider can examine the access point name to determine a type of network connection to be created (e.g., IP addresses to be assigned to the mobile phone) and a type of security to be used. The APN can also identify a packet data network to which the mobile phone can communicate.

A mobile service provider may have one or more central databases that contain details of each mobile phone that is authorized on the core network of the mobile service provider. A Home Location Register (HLR) record can store details of SIM cards issued by the mobile service provider, including the IMSI and the MSISDN.

Mobile service providers can provide wireless communication services to millions of customers having subscriber devices. The increase in threats in wireless networks generally, combined with the number of subscriber devices at risk from those threats, necessitates deployment of network security solutions to prevent malware infections. For example, deep packet inspection (DPI) solutions are often deployed in a mobile service provider's core networks between a gateway node on the packet-switched network side and a serving node on the radio communications side (e.g., in the Gn or S5 interface). DPI solutions may include, but are not limited to, intrusion prevention systems (IPS), intrusion detection systems (IDS), and next-generation firewalls (NGFWs).

Typically, DPI systems inspect network traffic and display network addresses of the network traffic when a security event is detected. In addition, some DPI systems can also analyze traffic and determine application information associated with a network address (e.g., chat applications, audio and video applications, etc.). In a network using Internet Protocol Suite (TCP/IP), for example, a DPI system may provide IP addresses of traffic flow when a security event is detected.

An IP address identified from a detected security event can enable identification of a network node on a packet data network, or can generally indicate that some subscriber device is associated with the security event. IP addresses alone, without additional identifying information, however, may not enable identification of particular subscriber devices associated with a detected security event. Without the ability to correlate particular malware attacks with particular subscriber devices, wireless administrators may be limited in their ability to identify problematic subscriber devices and to implement remedial or preventative measures targeting the problematic subscriber devices. Identifying information of particular subscriber devices associated with a security event may be very useful to wireless administrators. For example, MSISDN (telephone number), IMSI (SIM card number), IMEI (equipment number), and APN (access point name) may be desirable and useful information for a wireless administrator of a Mobile service provider.

In a configuration in which a network security device is deployed on a Gn or S5 interface of a mobile service provider's core network, mobile telephone numbers may be obtained by adding significant overhead to the network security device. For example, in one scenario, an intrusion prevention system (IPS) may deployed on the Gn interface. A GPRS Tunneling Protocol (GTP) inspection may be provided to obtain mobile phone information. GTP inspection, however, can add significant overhead to IPS processing on communications from millions of subscriber devices. Therefore, a more efficient approach is needed for obtaining pertinent mobile phone information and correlating it to security events.

A communication system for correlating security events with subscriber information in a mobile network environment, as outlined in FIG. 1 can resolve these issues (and others). In the communication system of FIG. 1, network security platform 30 can receive accounting information for each subscriber device that comes online in the mobile network environment. The accounting information can be parsed and a mapping table created. The mapping table can map or otherwise link network addresses assigned to subscriber devices to mobile telephone numbers assigned to the subscriber devices. Network addresses can also be mapped or otherwise linked to other subscriber device information. Network security platform 30 can monitor network data traffic, from or to subscriber devices, for any indications of a security event (e.g., malicious software, data leakage, or any other unauthorized activities). If a security event is detected, the security event can be correlated to the appropriate subscriber device, using the network address associated with the security event to search the mapping table. The security event information and the correlated subscriber device information (e.g., mobile telephone number and other subscriber device information) can be provided to a management console, which may be accessed by authorized wireless operators. Thus, the mobile telephone number can be derived for a detected security event in a Gi or SGi interface rather than a Gn or S5 interface in a mobile service provider's core network.

Correlated information that includes security event information and a mobile phone number (and other subscriber device information) provides numerous advantages. Access to this correlated information enables a mobile service provider to view a mobile phone number of a subscriber device that is associated with a security event. The mobile service provider may take immediate remediation actions, if desired. This information also provides a mobile service provider with more useful information about security issues in its mobile network by providing drilling down capabilities on detected security events based on mobile phone number, IMEI number, IMSI number, and/or APN number. As a result, patterns, trends, or other correlations between security events and the particular mobile phones associated with the security events can be identified and addressed accordingly. Moreover a mobile service provider may choose to educate subscribers (e.g., users/owners of subscriber devices) on their particular device issues. Additionally, mobile service providers may generate customer-specific threat reports and share with customers (e.g., on demand, as part of a monthly bill, etc.) on a regular or opt-in basis.

Turning to the infrastructure of FIG. 1, communication system 10 in accordance with an example embodiment is shown. A mobile service provider's core network in communication system 10 can include serving node 16. Serving node 16 can be a computing system configured to receive radio signals on a radio interface, translate the radio signals to data packets (e.g., IP packets), and communicate the data packets to another node over connection interface 18. Serving node 16 is also configured to receive data packets over connection interface 18, translate the data packets to radio signals, and communicate the radio signals to the appropriate subscriber device via a radio tower. For example, serving node may send and receive radio signals to subscriber device 12 via radio tower 14.

Gateway node 20 can be a computing system configured to receive and communicate data packets to other nodes in the mobile service provider's core network, in addition to nodes of other networks such as packet data network 8. AAA server 22 can be configured to provide an accounting feed with information related to subscriber devices having a status change (e.g., start connection, stop connection, continue connection) in communication system 10. In an embodiment, AAA server 22 can be configured using Remote Authentication Dial in User Service (RADIUS) networking protocol to authenticate users or devices to the network, to authorize users or devices for certain network resources, and/or to account for usage of the network resources. In other implementations, AAA server 22 can be configured using Diameter networking protocol.

AAA server 22 can receive pertinent phone information, such as MSISDN, IMSI, IMEI, and APN for each subscriber device that comes online (i.e., requests a network address) in communication system 10. AAA server 22 can be configured to provide a network address (e.g., IP address) to a subscriber device that requests one. AAA server 22 an provide an accounting feed to gateway node 20 and network security platform 30. The accounting feed can push subscriber accounting information to gateway node 20 each time a subscriber device comes online in communication system 10.

The particular configurations of components in a mobile service provider's core network may vary depending on the wireless standard that is implemented. For a 3rd Generation standard of mobile communications, serving node 16 can be a serving GPRS support node (SGSN), gateway node 20 could be a gateway GPRS support node (GGSN), connection interface 18 could be a Gn interface, and connection interface 26 could be a Gi interface. For a Long Term Evolution standard (LTE) 4G standard of mobile communications, serving node 16 can be an S-GW, gateway node 20 could be a P-GW, connection interface 18 could be an S5 Interface, and connection interface 26 could be an SGi Interface. The examples provided herein for particular components of a mobile service provider's core network are intended for illustrative purposes and are not intended to be limiting. It will be apparent that the concepts of the present disclosure may be applied to various mobile network environments implementing any number of wireless communication standards.

Network security platform 30 can be a computing system configured with deep packet inspection engine 32 to evaluate network data traffic for security events in communication system 10. Deep packet inspection engine 32 could be an IPS, an NGFW, an IDS, or any other suitable network security solution for inspecting data packets. Network data traffic could be received from PDN 8 or from subscriber device 12. Network security platform 30 may also include correlation module 36 to correlate security events with subscriber device information and provide the correlated information to management console 40. Management console 40 may be a computing system configured to receive security event notifications from network security platform 30. Management console 40 can store subscriber device information along with security event information in a database and can enable wireless operators to build a threat profile for the mobile network and subscriber devices.

Interface device 24 is a configured to connect AAA server 22 with network security platform 30 to enable the network traffic between AAA server 22 and gateway node 20 to also flow to network security platform 30. Thus, network security platform 30 receives accounting feeds from AAA server 22 and can parse the accounting packets to extract subscriber device information. In an embodiment, interface device 24 could be layer 3 switch with a SPAN port that provides, to network security platform 30, a copy of data packets that are sent from AAA server 22 to gateway 20. In another embodiment, interface device 24 could be a network TAP in which an access port is set up between a network element (e.g., layer 3 switch) and another network element (e.g., network security platform 30) to allow passive monitoring of network traffic flowing from AAA server 22 to gateway 20. In an embodiment, interface 24 could be integrated with gateway node 20 such that the accounting packets flow from gateway node 20 to network security device 30.

Serving node 16, gateway node 20, AAA server 22, interface 24, network security platform 30, and management console 40 are network elements that facilitate electronic communication with subscriber devices and/or other nodes in a given network (e.g., PDN 8). As used herein, the term 'network element' is meant to encompass computing systems, routers, switches, wireless access points (WAPs), gateways, bridges, loadbalancers, appliances, firewalls, servers, processors, modules, or any other suitable device, component, element, proprietary appliance, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information.

Figure 2:
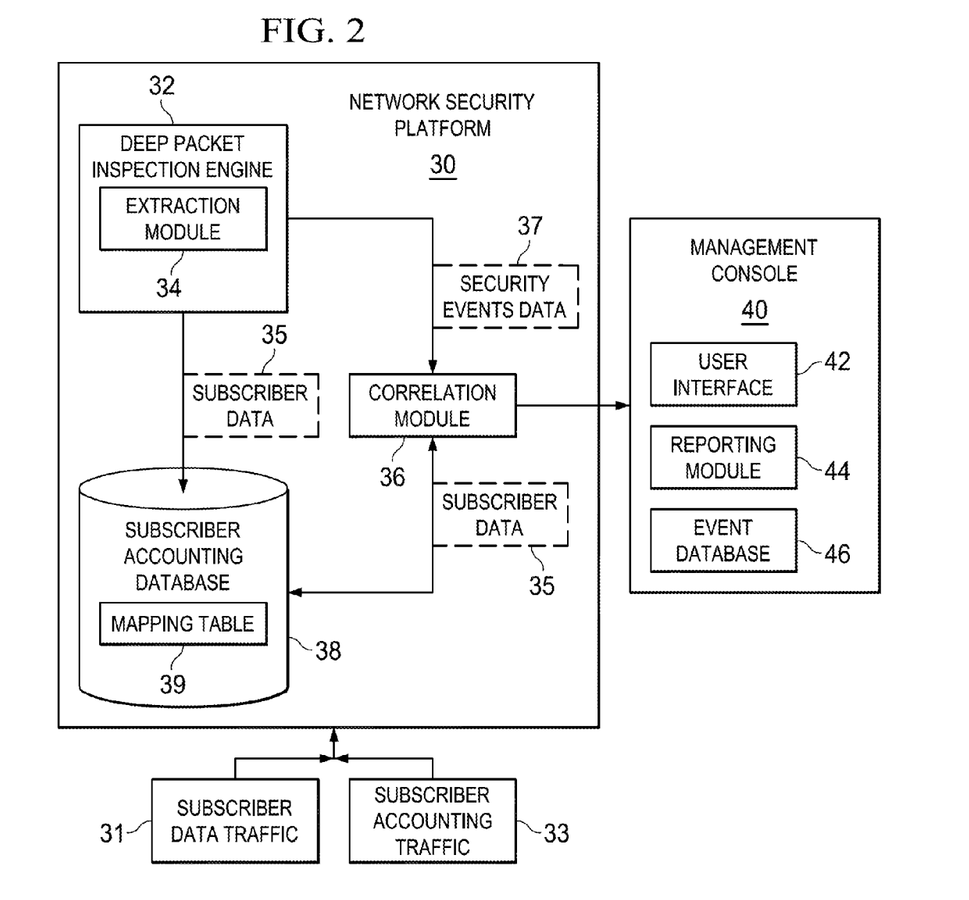
FIG. 2 is a simplified block diagram illustrating an example network security platform and management console in accordance with an embodiment.

Turning to FIG. 2, FIG. 2 is a block diagram illustrating some possible details associated with network security platform 30, which performs network data traffic inspection and subscriber accounting information processing. In an embodiment, network security platform 30 can include deep packet inspection engine 32 with an extraction module 34, correlation module 36, and a subscriber accounting database 38 with a mapping table 39.

Network security platform 30 can receive subscriber accounting traffic 33. In an embodiment, subscriber accounting traffic 33 can include an accounting start packet or an accounting stop packet for a subscriber device. An accounting start or stop packet is received in a data plane from AAA server 22. An accounting start packet indicates the start of a subscriber device's network access and can contain a network address assigned to the subscriber device in addition to subscriber device information. An accounting stop packet indicates the termination of network access by a subscriber device, and can contain the network address of the subscriber device. In some cases, an accounting stop packet may also include subscriber device information. The transmission and reception of subscriber accounting traffic 33 can include any appropriate communication protocol, including TCP/IP communication protocols such as Transmission Control Protocol (TCP), Stream Control Transmission Protocol (SCTP), Internet Protocol version 4 (IPv4), Internet Protocol version 6 (IPv6), etc.

By way of illustration, an accounting start packet can be created by AAA server 22 when subscriber device 12 initiates communication with communication system 10. In an example implementation, AAA server 22 may provide a network address to subscriber device 12. The network address can be an IP address in a TCP/IP messaging protocol. When a network access is granted to subscriber device 12, an accounting start request may be sent to AAA server 22. AAA server 22 can receive various subscriber device information from the accounting start request. Subscriber device information can include, but is not limited to, MSISDN (mobile telephone number), IMSI (SIM card number), IMEI (equipment number), and APN (access point name). Other subscriber device information may also be received in the accounting start request, such as subscriber device location. The network address of subscriber device 12 and any or all of the subscriber device information can be included in the accounting start packet created by AAA server 22. In one example embodiment, the accounting start packet can be the same configuration and include the same data as the accounting start request.

An accounting stop packet can be created by AAA server 22 when subscriber device 12 terminates its communication with communication system 10. By way of illustration, when subscriber device 12 terminates its connection to communication system 12, an accounting stop request is sent to AAA server 22. AAA server 22 may receive various subscriber device information from the accounting stop request, such as MSISDN, IMSI, IMEI, APN, subscriber device location, etc. The network address of subscriber device 12 and any or all of the subscriber device information can be included in the accounting stop packet. In one example embodiment, the accounting stop packet can be the same configuration and include the same data as the accounting stop request.

Subscriber accounting traffic 33, which includes an accounting stop or start packet, can be pushed from AAA server 22 to gateway node 20 via interface 24. Network security platform 30 can receive subscriber accounting traffic 33 from interface 24 via, for example, a SPAN or TAP configuration. Deep packet inspection engine 32 can include extraction module 34 to distinguish subscriber accounting traffic 33 from subscriber data traffic 31. In an example embodiment, subscriber accounting traffic 31 may not be subjected to a deep packet inspection as it can be assumed to be benign.

If subscriber accounting traffic 33 includes an accounting start packet for subscriber device 12, extraction module 34 parses the accounting start packet and collects the network address of subscriber device 12. Extraction module 34 can also extract subscriber device information such as MSISDN, IMSI, IMEI, and APN, and any other desired information such as subscriber device location. In an embodiment, extraction module 34 can build mapping table 39 with subscriber data 35, which includes the network address of subscriber device 12 and its subscriber device information. Mapping table 39 can be configured such that the network address of subscriber device 12 is mapped to its subscriber device information. Mapping table 39 may be stored in subscriber accounting database 38 of network security platform 30.

In an embodiment, a network address may be 'mapped' or 'linked' to subscriber device information using any suitable technique that results in a relationship between the network address and the subscriber device information in a memory element (e.g., in subscriber accounting database 38, in cache memory, etc.). In an embodiment, the relationship may be persistent in data storage such as subscriber accounting database 38. In one example implementation, the network address and each item of the subscriber device information can be stored in different columns of the same database record. In another example, the network address can be stored in mapping table 39 and one or more pointers can be provided to indicate the location of the subscriber device information. These examples are provided for illustrative purposes only. Numerous other mapping techniques may be used to map network addresses to subscriber device information, and such techniques are considered to be included within the broad scope of this disclosure.

If subscriber accounting traffic 33 includes an accounting stop packet, extraction module 34 parses the accounting stop packet and collects the network address of subscriber device 12. Extraction module 34 can search mapping table 39 for the network address of subscriber device 12. If the network address is found, then the network address can be deleted from mapping table 39. Therefore, if another subscriber device joins communication system 10 and is assigned the same network address, then a conflict in mapping table 39 is avoided. Subscriber device information that corresponds to the network address may also be deleted from mapping table 39.

Network security platform 30 can also receive subscriber data traffic 31. Subscriber data traffic may contain data packets that are being sent to or from subscriber device 12. A subscriber data packet can be examined by deep packet inspection engine 32 to identify any potential security events. A security event can include malicious software ("malware"), unauthorized software (although potentially not malicious), SPAM messages, data leakage, or any other unauthorized activities. The term "malware" is commonly used as a label for any hostile, intrusive, or annoying software such as a computer virus, spyware, adware, botnet, etc., but generally includes any software designed to interfere with the normal operation of a computer or network through unauthorized access, destruction, disclosure, modification of data, and/or denial of service.

If deep packet inspection engine 32 detects a security event in subscriber data traffic 31, then security event data 37, which can include security event information and the network address associated with subscriber data traffic 31, may be provided to correlation module 36. In an embodiment, a network address associated with subscriber data traffic 31 could be a source or destination IP address of the subscriber data traffic. In one embodiment, both the source and the destination network address are provided in security event data 37 with the security event information. Security event information may include, but is not limited to, an identifier of the detected security event.

Correlation module 36 correlates the subscriber device information for subscriber device 12 with the security event detected in subscriber data traffic 31. In an embodiment, correlation module 36 may search mapping table 39 for a network address that matches the network address associated with the detected security event. Either one or both of the source and destination network addresses from subscriber data traffic 31 may be used to search mapping table 39. If a matching network address is found, then the subscriber device information that is mapped to the matching network address is correlated to the detected security event. Accordingly, correlation module 36 may retrieve the correlated subscriber device information from mapping table 39. In an embodiment, correlation module 36 can then provide the matched network address, the subscriber device information, and the security event information to management console 40. Such information may be provided via an automatic correlation feed and may, in some scenarios, include an alert to one or more email addresses, phone numbers, computers, or other devices.

Management console 40 can include a user interface 42 and a reporting module 44. In an example embodiment, management console 40 can store the security event information and the correlated subscriber device information in security event database 46. Reporting module 44 can be configured to allow visibility into security event database 46 and/or to provide reports to the mobile service provider based on the security event information and/or the subscriber device information. A wireless operator could view a display, via user interface 42, in which security events can be drilled down based on any of the associated subscriber device information. For example, a display might be selected to show all of the security events for a particular mobile phone number (e.g., based on MSISDN), for a particular type of manufacturer (e.g., based on a portion of the IMEI identifying the manufacturer), for a particular SIM card (e.g., based on IMSI), or for a particular access point (e.g., based on APN). Thus, it is possible to determine, among other things, which subscriber devices have been subjected to which malware attacks, and which phone numbers have been responsible for any outgoing attacks. Moreover, a mobile service provider can leverage information received via management console 40 to remediate an attack and prevent further attacks. In particular, the identification of mobile phone numbers associated with particular malware attacks enables a mobile service provider to notify an end user regarding the malware attacks.

Figure 3:
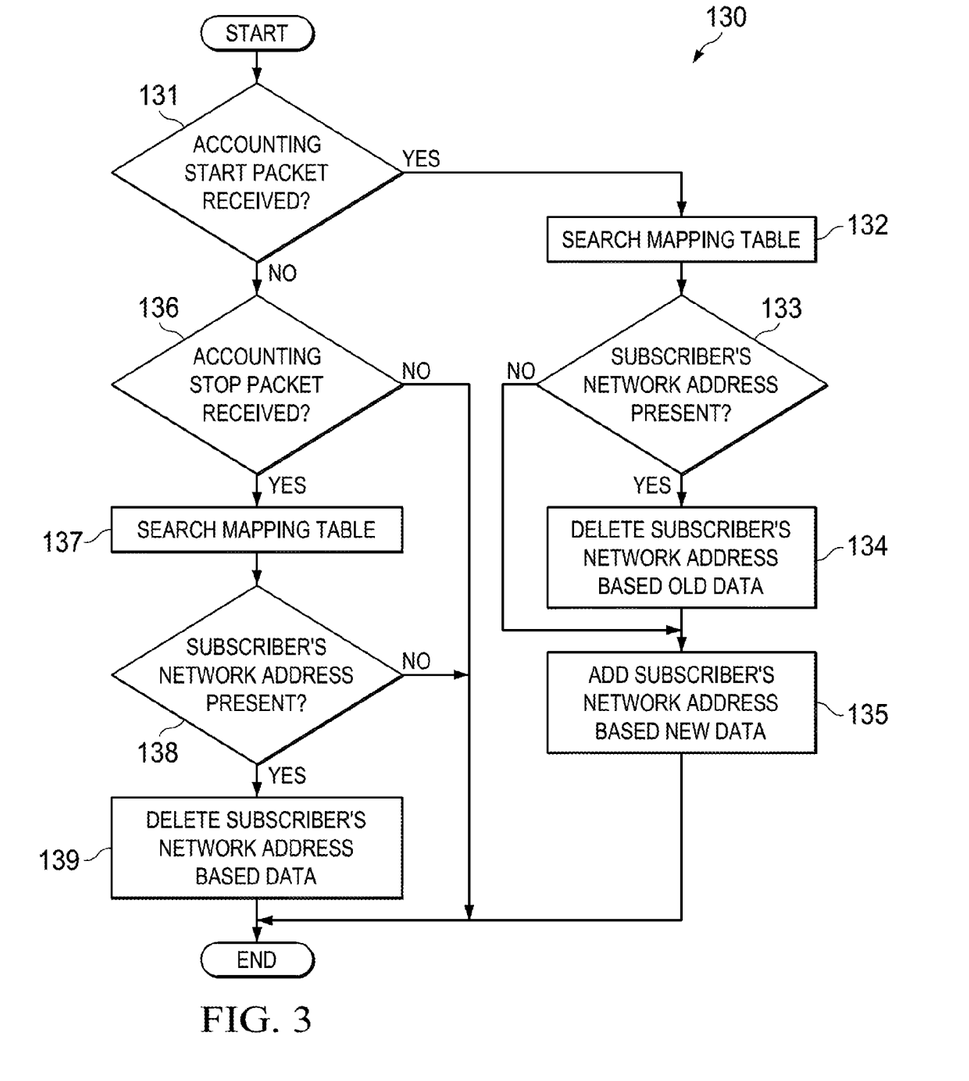
FIG. 3 is a simplified flowchart illustrating potential operations that may be associated with the communication system in accordance with an embodiment.

Turning to FIG. 3, a flowchart illustrates an example flow 130 that may be associated with communication system 10 for correlating security events with subscriber information in a mobile network environment. In an embodiment, flow 130 represents one or more activities performed by extraction module 34 in deep packet inspection engine 32 of network security platform 30.

Flow 130 may begin at 131, where a determination is made as to whether an accounting start packet is received. An accounting start packet may be received from AAA server 22. If an accounting start packet has been received, then mapping table 39 may be searched at 132 for a network address that matches a network address of the accounting start packet. If it is determined at 133 that a matching network address is present in mapping table 39, then at 134, the network address and associated subscriber device information are deleted from mapping table 39. At 135, the network address of accounting start packet and its associated subscriber device information may be added to mapping table 39. With reference again to 133, if it is determined that a matching network address is not present in mapping table 39, then at 135, the network address of accounting start packet and its associated subscriber device information may be added to mapping table 39. Once these updates are made for the accounting start packet, flow 130 may end.

If it is determined at 131 that an accounting start packet has not been received, then at 136, a determination is made as to whether an accounting stop packet is received. If an accounting stop packet has also not been received, then flow 130 may end because there are no updates needed to subscriber accounting database 38.

If it is determined at 136 that an accounting stop packet has been received, then at 137, mapping table 39 may be searched for a network address that matches a network address of the accounting stop packet. If it is determined at 138 that a matching network address is not present in mapping table 39, then flow 130 may end without any updates to subscriber accounting database 38. However, if it is determined at 138 that a matching network address is present in mapping table 39, then at 139, the network address and any associated subscriber device information is deleted from mapping table 39, and flow 130 may end.

Figure 4:
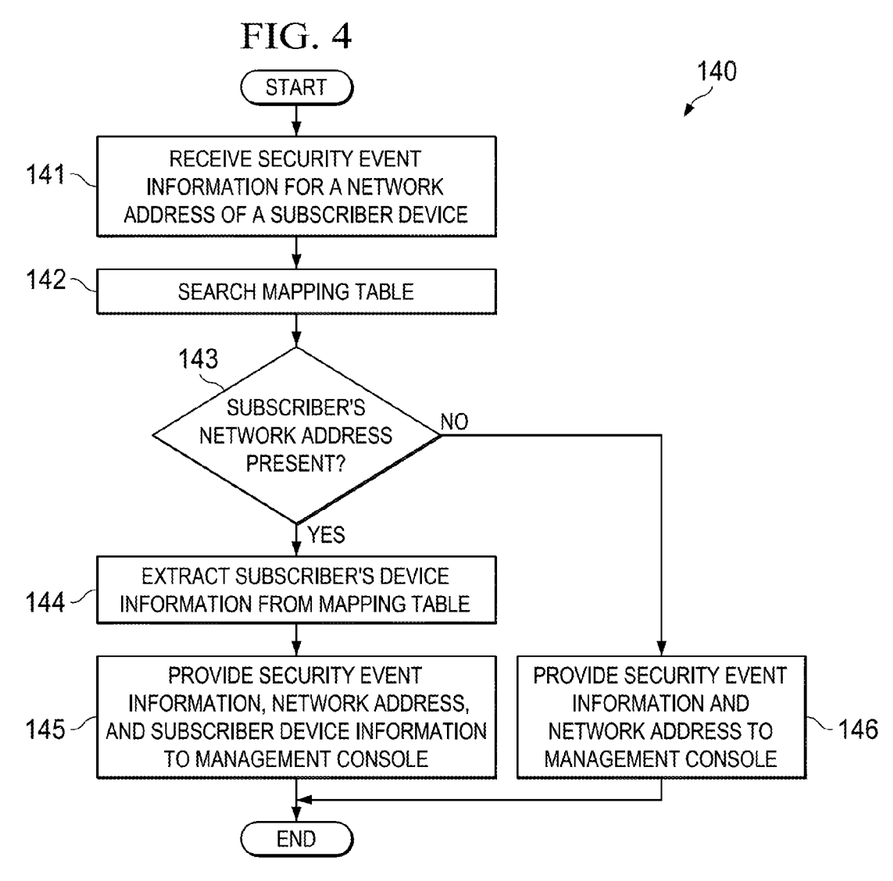
FIG. 4 is a simplified flowchart illustrating additional potential operations that may be associated with the communication system in accordance with an embodiment.

Turning to FIG. 4, a flowchart illustrates an example flow 140 that may be associated with communication system 10 for correlating security events with subscriber information in a mobile network environment. In an embodiment, flow 140 represents one or more activities performed by correlation module 36 in network security platform 30.

Flow 140 may begin at 141, where security event data 37 is received. Security event data 37 can include security event information. The security event information represents a security event detected in subscriber data traffic 31. The security event was detected by deep packet inspection engine 32 after receiving subscriber data traffic 31. Security event data 37 can also include either one or both of a source network address and destination network address from subscriber data traffic 31. At 142, mapping table 39 may be searched for a network address that matches the network address associated with the detected security event. In an embodiment, mapping table 39 may be searched using either one or both of the source network address and the destination network address associated with the detected security event. If it is determined at 143 that a matching network address is not present in mapping table 39, then at 146, the security event information and the network address may be provided to management console 40, and flow 140 may end.

However, if it is determined at 143 that a matching network address is present in mapping table 39, then at 144, the subscriber device information mapped to the network address may be extracted from mapping table 39. At 145, the security event information, the network address of the associated subscriber device, and the subscriber device information extracted from mapping table 39 may be provided to management console 40. Once the information is sent to management console 40, flow 140 may end.

Figure 5:
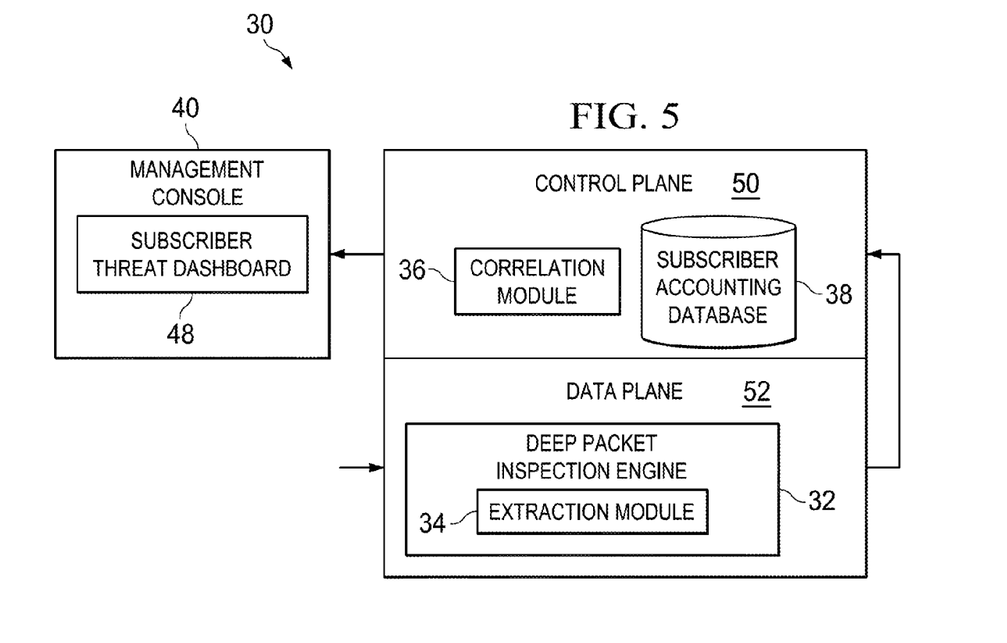
FIG. 5 is a simplified block diagram illustrating additional details associated with an example network security platform and management console in accordance with an embodiment.

FIG. 5 is a block diagram illustrating one example of where data may be processed and maintained in communication system 10. Network security platform 30 can have a control plane 50 and a data plane 52. Subscriber accounting traffic 33 is received in data plane 52. Extraction module 34 extracts subscriber device information from subscriber accounting traffic 33 in data plane 52. In control plane 50, mapping table 39 in subscriber accounting database 38 can be populated and maintained. Correlation module 36 may receive security events from data plane 52 and search mapping table 39 in subscriber accounting database 38 in control plane 50. Management console 40 can include a subscriber threat dashboard 48 to display subscriber device information along with associated security event information, which are received from control plane 50 of network security platform 30.

Figure 6:
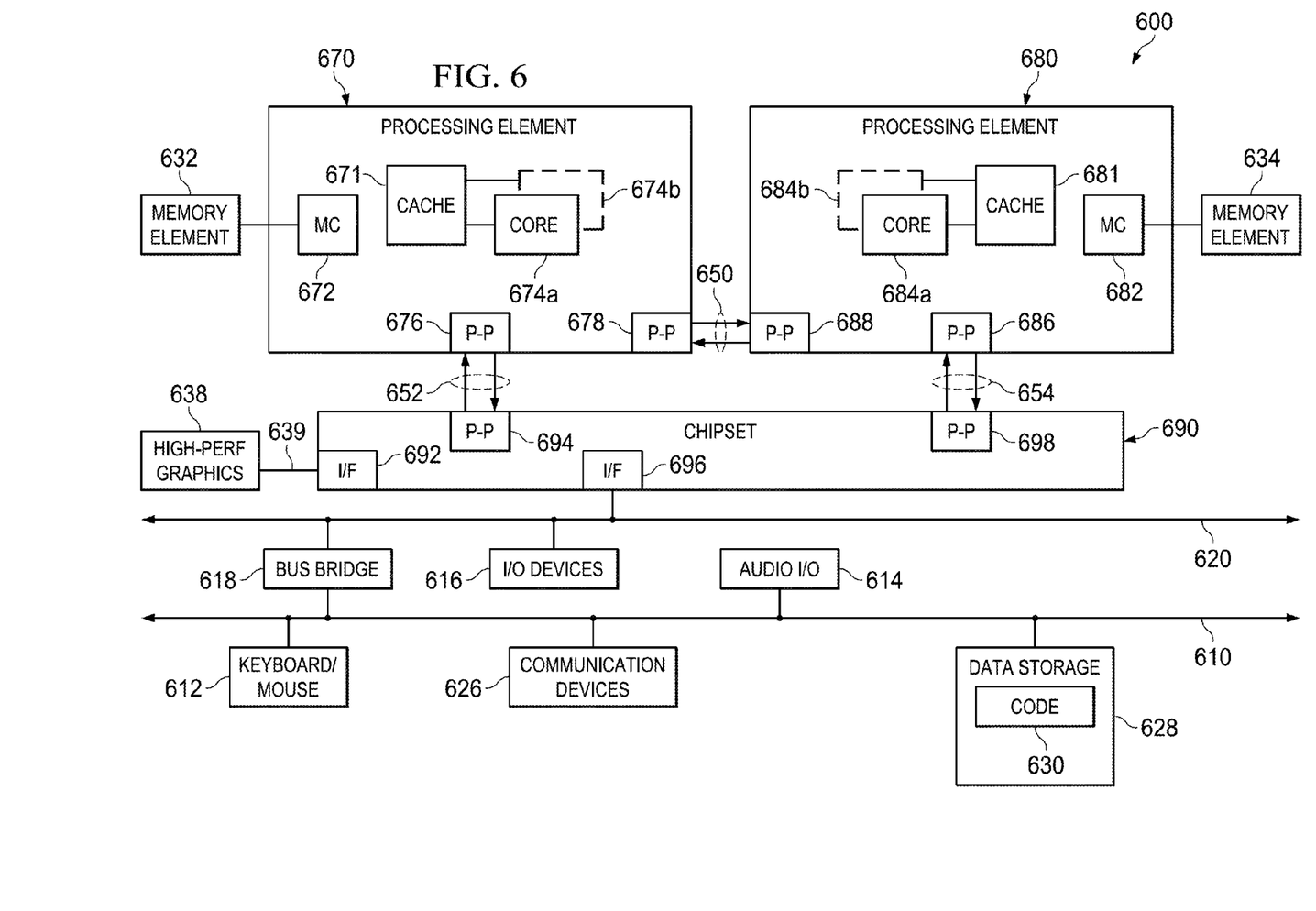
FIG. 6 is a block diagram illustrating a computing system that is arranged in a point-to-point configuration according to an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, network elements of communication system 10 may be configured in the same or similar manner as computing system 600. For example network security platform 30 and management console 40, as described herein, may each be a computing system, such as exemplary computing system 600.

As illustrated in FIG. 6, system 600 may include several processing elements, of which only two processing elements 670 and 680 are shown for clarity. While only two processing elements 670 and 680 are shown, it is to be understood that an embodiment of system 600 may also include only one such processing element. Processing elements 670 and 680 may each include a processor core 674a and 684a to execute multiple threads of a program. Processors 670 and 680 may also each include integrated memory controller logic (MC) 672 and 682 to communicate with memory elements 632 and 634. The memory elements 632 and/or 634 may store various data. In alternative embodiments, memory controller logic 672 and 682 may be discrete logic separate from processing elements 670 and 680.

Processing elements 670 and 680 may be any type of a processing element (also referred to herein as 'processor'). Processing elements 670 and 680 may exchange data via a point-to-point (PtP) interface 650 using point-to-point interface circuits 678 and 688, respectively. Processing elements 670 and 680 may each exchange data with a chipset 690 via individual point-to-point interfaces 622 and 624 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

As shown in FIG. 6, each of processing elements 670 and 680 may be multicore processors, including first and second processor cores (i.e., processor cores 674a and 674b and processor cores 684a and 684b). Such cores may be configured to execute instruction code in a manner similar to that discussed above with reference to FIGS. 2-5. Each processing element 670, 680 may include at least one shared cache 696. Shared cache 671, 681 may store data (e.g., instructions) that are utilized by one or more components of processing elements 670, 680, such as cores 674a, 674b, 684a, and 684b.

Chipset 690 may be in communication with a bus 620 via an interface circuit 696. Bus 616 may have one or more devices that communicate over it, such as a bus bridge 618 and I/O devices 616. Via a bus 610, bus bridge 618 may be in communication with other devices such as a keyboard/mouse 612 (or other input device such as a touch screen, trackball, etc.), communication devices 626 (such as modems, network interface devices, or other types of communication devices that may communicate through a computer network), audio I/O devices 614, and/or a data storage device 628. Data storage device 628 may store code 630 that may be executed by processing elements 670 and/or 680. In alternative embodiments, any portions of the bus architectures could be implemented with one or more PtP links.

In one example implementation, network elements of communication system 10 may include software in order to achieve the correlating activities outlined herein. These activities can be facilitated by various modules (e.g., deep packet inspection engine 32, extraction module 34, correlation module 36, user interface 42, reporting module 42, etc.), which can be suitably combined in any appropriate manner, and which may be based on particular configuration and/or provisioning needs. In other embodiments, these correlating activities may be executed externally to these elements, or included in some other network element to achieve this intended functionality. In still other embodiments, the elements in communication system 10 may include this software (or reciprocating software) that can coordinate with other network elements in order to achieve the operations, as outlined herein. Furthermore, the modules can be implemented as software, hardware, firmware, or any suitable combination thereof.

Note that in certain example implementations, the correlating activities outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor (e.g., processing elements 670, 680), or other similar machine, etc.). In some of these instances, one or more memory elements (as shown in FIG. 6) can store data used for the operations described herein. This includes the memory element being able to store software, logic, code, or processor instructions that are executed to carry out the activities described in this Specification.

A processor (as shown in FIG. 6) can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this Specification should be construed as being encompassed within the broad term 'processor.'

The network elements in communication system 10 may further keep information, to be used in achieving the correlating activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Moreover, the information being used, tracked, sent, or received in communication system 10 could be provided in any database, register, queue, table, cache, or other storage structure, all of which can be provided in any suitable timeframe. Any of the memory items or storage options may be included within the broad term 'memory element' as used herein.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible correlating scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. For example, management console 40 may be integrated with network security platform 30. Data storage elements may also be combined. Additionally, although communication system 10 has been illustrated with reference to particular elements and operations that facilitate the communication process, these elements and operations may be replaced by any suitable architecture, protocols, and/or processes that achieve the intended functionality of communication system 10.

What is claimed is:
1. A method, comprising:
identifying one or more first packets as subscriber accounting traffic associated with a subscriber device in a mobile network environment;
extracting, from a subscriber accounting start packet of the one or more first packets, subscriber device information and a network address of the subscriber device;
mapping, in a first memory element, the network address to the subscriber device information;
identifying one or more second packets as subscriber data network traffic; and
correlating the subscriber device information and a security event if the security event is detected in the one or more second packets and if the one or more second packets are associated with the subscriber device, wherein the correlating comprises:
    searching the first memory element for at least one of a source network address and a destination network address of the one or more second packets;
    obtaining, from the first memory element, the subscriber device information mapped to the network address of the subscriber device, when the network address of the subscriber device corresponds to one of the source network address and the destination network address.

2. The method of claim 1, wherein the subscriber device information includes at least one of an International Mobile Equipment Identity (IMEI), an International Mobile Subscriber Identity (IMSI), a Mobile Station International Subscriber Directory Number (MSISDN), and an access point name (APN).

3. The method of claim 1, wherein the mapping includes storing the network address and the subscriber device information in a mapping table of the first memory element.

4. The method of claim 3, further comprising:
receiving a subscriber accounting stop packet;
identifying a network address in the accounting stop packet;
searching the mapping table for a stored network address corresponding to the network address of the accounting stop packet; and
deleting the stored network address from the mapping table.

5. The method of claim 3, further comprising, prior to the storing:
identifying the network address in the accounting start packet;
searching the mapping table for the network address; and
deleting the network address from the mapping table if the network address is found in the mapping table.

6. The method of claim 1, further comprising:
identifying the source network address and the destination network address in the one or more second packets to be used for searching the first memory element.

7. The method of claim 1, further comprising:
providing, after the correlating, the security event information and the subscriber device information to a management console.

8. Logic encoded in one or more non-transitory computer-readable media that includes code for execution and when executed by a processor is operable to perform operations comprising:
identifying one or more first packets as subscriber accounting traffic associated with a subscriber device in a mobile network environment;
extracting, from a subscriber accounting start packet of the one or more first packets, subscriber device information and a network address of the subscriber device;
mapping, in a first memory element, the network address to the subscriber device information; and
identifying one or more second packets as subscriber data network traffic; and
correlating the subscriber device information and a security event if the security event is detected in the one or more second packets and if the one or more second packets are associated with the subscriber device, wherein the correlating comprises:
searching the first memory element for at least one of a source network address and a destination network address of the one or more second packets;
obtaining, from the first memory element, the subscriber device information mapped to the network address of the subscriber device, when the network address of the subscriber device corresponds to one of the source network address and the destination network address.

9. The logic of claim 8, wherein the subscriber device information includes at least one of an International Mobile Equipment Identity (IMEI), an International Mobile Subscriber Identity (IMSI), a Mobile Station International Subscriber Directory Number (MSISDN), and an access point name (APN).

10. The logic of claim 9, wherein the mapping includes storing the network address and the subscriber device information in a mapping table of the first memory element.

11. The logic of claim 10, wherein the processor is operable to perform further operations comprising:
receiving a subscriber accounting stop packet;
identifying a network address in the accounting stop packet;
searching the mapping table for a stored network address corresponding to the network address of the accounting stop packet; and
deleting the stored network address from the mapping table.

12. The logic of claim 10, wherein the processor is operable to perform further operations comprising:
identifying the network address in the accounting start packet;
searching the mapping table for the network address; and
deleting the network address from the mapping table if the network address is found in the mapping table.

13. The logic of claim 8, wherein the first memory element comprises one or more real-time network addresses assigned to one or more respective subscriber devices currently online in the mobile network environment.

14. The logic of claim 8, wherein the processor is operable to perform further operations comprising:
storing, in a second memory element, the device information and the security event information obtained from the first memory element; and
generating a report, from the second memory element, that indicates a total number of security events associated with the subscriber device and a type of each security event associated with the subscriber device.

15. An apparatus, comprising:
a memory element configured to store data;
a processor operable to execute instructions associated with the data; and
an extraction module configured to interface with the memory element and the processor to:
identify one or more first packets as subscriber accounting traffic associated with a subscriber device in a mobile network environment;
extract, from a subscriber accounting start packet of the one or more first packets, subscriber device information and a network address of the subscriber device;
map, in a first memory element, the network address to the subscriber device information; and
identify one or more second packets as subscriber data network traffic; and
a correlation module configured to interface with the memory element and the processor to correlate the subscriber device information and a security event if the security event is detected in the one or more second packets and if the one or more second packets are associated with the subscriber device, wherein the correlation module is to:
search the first memory element for at least one of a source network address and a destination network address of the one or more second packets;
obtain, from the first memory element, the subscriber device information mapped to the network address of the subscriber device, when the network address of the subscriber device corresponds to one of the source network address and the destination network address.

16. The apparatus of claim 15, wherein the subscriber device information includes at least one of an International Mobile Equipment Identity (IMEI), an International Mobile Subscriber Identity (IMSI), a Mobile Station International Subscriber Directory Number (MSISDN), and an access point name (APN).

17. The apparatus of claim 15, wherein the correlation module is further configured to map the network address to the subscriber device information by storing the network address and the subscriber device information in a mapping table of the first memory element.

18. The apparatus of claim 17, wherein the extraction module is further configured to:
  receive a subscriber accounting stop packet;
  identify a network address in the accounting stop packet;
  search the mapping table for a stored network address corresponding to the network address of the accounting stop packet; and
  delete the stored network address from the mapping table.

19. The apparatus of claim 17, wherein the extraction module is further configured to:
  identify the network address in the accounting start packet;
  search the mapping table for the network address; and
  delete the network address from the mapping table if the network address is found in the mapping table.

20. The apparatus of claim 15, wherein the apparatus is deployed in one of a Gi or an SGi interface in a core network of the mobile network environment.

* * * * *